United States Patent
Fung et al.

(10) Patent No.: US 8,889,782 B2
(45) Date of Patent: Nov. 18, 2014

(54) PEELABLE PROTECTIVE FILM AND COMPOSITION THEREOF

(71) Applicant: Nan Ya Plastics Corporation, Taipei (TW)

(72) Inventors: Dein-Run Fung, Taipei (TW); Te-Chao Liao, Taipei (TW); Chun-Lai Chen, Taipei (TW); Tzai-Shing Chen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 14/097,485

(22) Filed: Dec. 5, 2013

(65) Prior Publication Data

US 2014/0171569 A1     Jun. 19, 2014

(30) Foreign Application Priority Data

Dec. 19, 2012   (TW) .............................. 101148273 A

(51) Int. Cl.
  *C08G 81/02*   (2006.01)
  *C07C 67/08*   (2006.01)
  *C09D 5/20*    (2006.01)

(52) U.S. Cl.
  CPC ...................................... *C09D 5/20* (2013.01)
  USPC ........................................ 524/514; 524/310

(58) Field of Classification Search
  CPC .......................................................... C09D 5/20
  USPC ........................................................ 524/514
  See application file for complete search history.

(56) References Cited

U.S. PATENT DOCUMENTS 6,211,282 B1 *   4/2001   Yamashita et al. ............. 524/501

* cited by examiner

*Primary Examiner* — Hui Chin
(74) *Attorney, Agent, or Firm* — Bacon & Thomas, PLLC

(57) ABSTRACT

A peelable protective film having perfect adhesion for providing temporary protection to objects is disclosed, which protective film having a peel strength ranging between 35 and 100 g/cm is capable of being easily peeled off from an adhered object and without leaving any residual adhesive; a composition containing a vinyl chloride-vinyl acetate copolymer, a high-molecular-weight emulsified, polymerized PVC powder, a low-molecular-weight emulsified, polymerized PVC powder, a trimellitate plasticizer, a diisobutyrate-based plasticizer, a phenol-free Ca—Zn stabilizer, fumed silica, aluminum hydroxide, barium sulfate and calcium carbonate is so suited for making the peelable protective film having a thixotropic index ranging between 2.00 and 2.20.

9 Claims, No Drawings

PEELABLE PROTECTIVE FILM AND COMPOSITION THEREOF

BACKGROUND OF THE PRESENT INVENTION

1. Field of the Invention

The present invention relates to a peelable protective film, and more particularly, to a peelable protective film that can be easily peeled off after intermediate processing process without leaving residual adhesive, also relates to a composition of such film.

2. Description of Related Art

Peelable protective film is extensively used for the purposes of adhesion, dust resistance and scratch resistance now. In respect of high-end commodities, such as electronic devices or optical devices, such film is not only often used to protect the appearance of such devices during a period of marketing or storing the devices, but also often used as an adhesive packaging material that temporarily provides a close protection to a processed component or a manufactured article (both hereinafter referred to as "adhered object(s)") during an intermediate process for producing or a period of stocking the adhered object(s). After the adhered object is finished with the intermediate process or entered for formal use, such film may be peeled off from the adhered object easily, leave the adhered object intact and keep the appearance of the adhered object without hurt.

However, the existing peelable protective film has a common drawback, taking an acrylic copolymer protective film disclosed in U.S. Pat. No. 6,211,282 as an example; such film tends to come off from the adhered object during high-pressure washing. Furthermore, such film if peeled off from the adhered object thereof is likely to have its adhering components formed as an adhesive layer (hereinafter referred to as "residual adhesive") and stuck on the surface of the adhered object, resulted in that it is required additional time and energy for removing the residual adhesive. Thus, such existing peelable protective film needs to be improved.

Additionally, the process for producing such existing peelable protective film is involved in use of solvent as well as is contained a crosslink curing process, such solvent or such crosslink agent is adverse to environmental protection. Particularly, the used peelable protective film is not recyclable and can be only treated as waste, also against environmental protection.

SUMMARY OF THE INVENTION

For overcoming the aforementioned shortcomings of the prior art, the present invention herein provides a peelable protective film whose manufacturing does not be involved in use of any solvent and crosslink curing process. With proper combinations of resins and plasticizers, the disclosed peelable protective film displays dimensional stability, consistent viscosity, appropriate adhesion, excellent water resistance and thermal stability. After use, the disclosed peelable protective film can be easily peeled off without breaking and leaving residual adhesive. Since it contains no solvent, the disclosed peelable protective film is recyclable and reusable, being favorable to environmental protection.

The peelable protective film of the present invention is made of a composition according to the compositional formula given below, with all weight percentages based upon the total weight of the composition:

a) vinyl chloride-vinyl acetate copolymer, having a K-value of 69 to 71 (where the K-value given by DIN standard 53726, hereinafter same method), and being present in an amount ranging between 10 and 65 wt %, wherein vinyl acetate takes 1.0-12.5%, and preferably 4.0-6.9%;

b) high-molecular-weight emulsified, polymerized PVC powder, having a K-value of 77.5 to 81, and being present in an amount ranging between 3 and 20 wt %;

c) low-molecular-weight emulsified, polymerized PVC powder, having a K-value of 73.0 to 76.5, and being present in an amount ranging between 3 and 20 wt %;

d) a trimellitate plasticizer, being present in an amount ranging between 5 and 40 wt %;

e) a combination of a phthalate plasticizer and a diisobutyrate plasticizer, being present in an amount ranging between 1 and 20 wt %;

f) a phenol-free Ca—Zn stabilizer, being present in an amount ranging between 0.5 and 3 wt %;

g) fumed silica (also referred to as pyrogenic silica), and being present in an amount ranging between 1 and 10 wt %;

h) aluminum hydroxide, being present in an amount ranging between 0.1 and 10 wt %;

i) barium sulfate, being present in an amount ranging between 0.1 and 20 wt %; and j) calcium carbonate, being present in an amount ranging between 0.1 and 20 wt %.

In addition to being adhesive, dust-proof and scratch-proof, the disclosed peelable protective film also meets the following requirements and is suitably used for protecting optical devices:

1. The peelable protective film has a peel strength ranging between 35 and 100 g/cm, and can be easily peeled off, without leaving any residual adhesive on the adhered object;

2. The peelable protective film is resistant to baking to the extent that after three cycles of being baked at 180° C. for 10 minutes, the adhesive layer of the peelable protective film is still tenacious and has its surface remaining dry and adhesive;

3. The peelable protective film has excellent adhesion, so that under one or more of the following treatments, it remains firmly staying on the adhered object:

a) ultrasonic vibration of 46 khz at 45° C. for 5 minutes;

b) high-pressure washing of 10 kg/cm$^2$;

c) immersion in heated water of 60° C. for 26 minutes;

d) immersion in NaOH-based alkaline solution of 3.17% at 40° C. for 2 minutes; and e) immersion in acid solution of aqua regia at 46° C. for 2 minutes.

DETAILED DESCRIPTION OF THE INVENTION

The peelable protective film of the present invention is made through a coating process from a composition having a certain compositional formula (hereinafter referred to as the "peelable composition") at the room temperature. It has viscosity stability, water resistance and thermal stability, and when adhered to or stuck on an adhered object, it displays a peel strength ranging between 35 and 100 g/cm. After use, it can be easily peeled off from the adhered object without leaving any residual adhesive. The manufacturing process does not be involved in use of any solvent, so the peelable protective film is recyclable for further use.

The peelable composition, at an ambient temperature of 25° C., has physical properties including a viscosity ranging between 400 and 600 ps as measured by Viscotester VT-04 and a thixotropic index (T.I.) ranging between 2.00 and 2.20 as measured by DVII+Pro Viscometer (MA, USA; Brookfield Engineering) (hereinafter referred to as the rotational viscometer) at settings of "viscosity at 0.5 rpm/viscosity at 2.5 rpm", and has the following components, with all weight percentages based upon the total weight of the composition:

a) vinyl chloride-vinyl acetate copolymer, having a K-value of 69 to 71, and being present in an amount ranging between 10-65 wt %, wherein vinyl acetate takes 1.0-12.5%, and preferably 4.0-6.9%;

b) high-molecular-weight emulsified, polymerized PVC powder, being present in an amount ranging between 3 and 20 wt %, and having an average degree of polymerization (Average DP) ranging between 1650 and 1850, and a K-value of 77.5 to 81;

c) low-molecular-weight emulsified, polymerized PVC powder, being present in an amount ranging between 3 and 20 wt %, and having an average degree of polymerization ranging between 1350 and 1550, and a K-value of 73.0 to 76.5;

d) a trimellitate plasticizer, being present in an amount ranging between 5 and 40 wt %;

e) a diisobutyrate plasticizer, being present in an amount ranging between 1 and 20 wt %, and preferably a TXIB (2,2,4-trimethyl-1,3-pentanediol diisobutyrate) plasticizer, wherein the ratio of the trimellitate plasticizer to the TXIB plasticizer is 1.0-9.0, and preferably 4.0-6.0;

f) a phenol-free Ca—Zn stabilizer, being present in an amount ranging between 0.5 and 3 wt %;

g) fumed silica, being present in an amount ranging between 1 and 10 wt %;

h) aluminum hydroxide, being present in an amount ranging between 0.1 and 10 wt %;

i) barium sulfate, being present in an amount ranging between 0.1 and 20 wt %;

j) calcium carbonate, being present in an amount ranging between 0.1 and 20 wt %.

Since the disclosed composition contains numerous solid and liquid components, the feeding sequence of these components during mixing can significantly influence the viscosity of the resultant composition. For getting stable viscosity without using any solvent, the following feeding sequence is recommended. The vinyl chloride-vinyl acetate copolymer power, low-molecular-weight PVC powder, and then high-molecular-weight PVC powder are separately dissolved in the plasticizers in order. It is to be noted not to feed the high-molecular-weight PVC powder any earlier, or the viscosity will be sharply increased. The mixing lasts for 40 minutes, and then the mixture is set aside for at least 2 hours to allow the copolymer power and PVC powders to swell adequately, thereby ensuring stable viscosity. Both of the components of fumed silica and aluminum hydroxide can makes the viscosity increase rapidly, so should be put in later at a low mixing speed. The mixing process is detailed below:

(1) feeding the trimellitate plasticizer into a mixer, then feeding the diisobutyrate plasticizer and the Ca—Zn stabilizer, running mixing paddles of the mixer slowly and adding the vinyl chloride-vinyl acetate copolymer, the low-molecular-weight emulsified, polymerized PVC powder, and last the high-molecular-weight emulsified, polymerized PVC powder slowly in order, mixing a resultant mixture for 40 minutes, and setting the mixture aside for at least 2 hours;

(2) running the mixing paddles fast, and feeding the barium sulfate and the calcium carbonate in order;

(3) mixing the mixture of (2) for 5 minutes, slowing down the mixing paddles, and feeding the fumed silica and the aluminum hydroxide;

(4) mixing the mixture of (3) for 30±5 minutes to make the mixture have a viscosity ranging between 400 and 600 ps at 25° C.

The vinyl chloride-vinyl acetate copolymer is made by polymerizing vinyl chloride monomer and vinyl acetate monomer. The more vinyl acetate is, the higher the adhesion strength of the resultant vinyl chloride-vinyl acetate copolymer is. For making the film have good adhesion and be easy peeled off, the content of vinyl acetate should be appropriate, avoiding being too high or too low. With an appropriate content of vinyl acetate, the resultant vinyl chloride-vinyl acetate copolymer can enjoy the good tenacity and corrosion resistance inherited from vinyl chloride and the strong viscosity and plasticity inherited from vinyl acetate. When coated into film, the resultant film has good dimensional stability. Also it is resistant to high-temperature baking, hot-water immersion, acid, alkali, moisture, water, and is nonflammable and combustion-supporting.

The high-molecular-weight emulsified, polymerized PVC powder is relatively less viscid and can be gelatinized at a relatively low temperature. It can be made into film through a coating process at the room temperature. The resultant film is water-proof and anti-static.

The low-molecular-weight emulsified, polymerized PVC powder is properly viscid, and when made into film displays good mold-release properties.

The disclosed peelable protective film composition includes the vinyl chloride-vinyl acetate copolymer and the emulsified, polymerized PVC powder products of different average degrees of polymerization. Without using any solvents, the combination of a proper amount of the vinyl chloride-vinyl acetate copolymer and proper amounts of the high- and low-molecular-weight emulsified, polymerized PVC powder products can produce peelable protective film that has perfect adhesion strength, tensile strength and tenacity for the purpose of protectiveness. As a protective product, the film is easy to peel off, unlikely to break and leaves no residual adhesive. Meanwhile, the combination of the three components makes the composition have the most stable thixotropic index and less variation, being favorable to the film coating process.

The trimellitate plasticizer may be one or a combination of two or more of trimethyl trimellitate (TMTM), triethyl trimellitate (TETM), trihexyl trimellitate (THTM), trisooctyl trimellitate (TIOTM) and tri(2-ethylhexyl)trimellitate (TOTM). Under high-temperature baking at 100-180° C., it is less migratory and remains dry at its surface without stickiness, but still have good tenacity.

The plasticizer 2,2,4-trimethyl-1,3-pentanediol diisobutyrate (TXIB) is a benzene-ring free, non-toxic, environmentally protective plasticizer. It is easy to be mixed with the vinyl chloride-vinyl acetate copolymer. It can not only reduce the viscosity of the disclosed peelable composition, but also improve the flow behavior of the disclosed peelable composition, allowing the disclosed peelable composition to have stable viscosity and prevent air bubble ingress. This makes the disclosed peelable composition perfect for film made through a coating process. Additionally, the resultant film has smooth surface that is smear-proof and abrasion-proof (or scratch-proof), so the film is unlikely to have scratches in use.

The disclosed peelable composition contains both of the trimellitate plasticizer and the diisobutyrate plasticizer, without using any solvents. By changing the using amounts of the both plasticizers, wherein the ratio of the trimellitate plasticizer to the TXIB plasticizer is 1.0-9.0, and preferably 4.0-6.0, the resultant peelable composition can be adjusted to have proper and stable viscosity. This not only is favorable to producing film from the peelable composition, but also allows the resultant film to be soft, tough and scratch-proof. Particularly, after 3 cycles of being baked at 180° C. for 10 minutes, the film can still display good tenacity and dryness. A pre-baked at 100-120° C. for 3 minutes, the first side of the protective film does not stick on the printing table when the second side is printed. The first side is not sticky, and is suitable for the purpose of peelable protective film. Also, during the process of peeling off the peelable protective film, the peelable protective film is secured from breakage.

The phenol-free Ca—Zn stabilizer contains no solvent of Nonyl Phenol, Bis-Phenol-A and Phenol. By using it, the manufacturing process of the disclosed film is free from phenol-based solvent and the heat tolerance of the disclosed peelable composition can be improved.

Fumed silica is used herein as a thickening agent for adjusting the viscosity of the disclosed peelable composition, to prevent material sagging and prevent precipitation of fillers. The fumed silica used preferably has a particle size ranging between 5-50 nm and a surface area ranging between 50-600 $m^2/g$.

For preventing the viscosity from significant change over time, in addition to fumed silica, aluminum hydroxide is also used for thickening. Aluminum hydroxide reacts with both acids and alkalis to produce resistance to both acids and alkalis, being a distinguishing feature of the present invention. Preferably, the using amount of fumed silica is 2 to 6 times as much as that of aluminum hydroxide. The using amounts of the both components can be changed to make the thixotropic index of the composition range between 2.00 and 2.20.

In addition, the diisobutyrate plasticizer used in the disclosed peelable composition is a nonionic surfactant that contains both hydrophilic groups and hydrophobic groups. As described above, aluminum hydroxide reacts with both acids and alkalis. Accordingly, in the disclosed peelable composition, the combination of aluminum hydroxide and the diisobutyrate plasticizer helps the nonionic surfactant to form micelles, thereby increasing the surface tension of the surfactant, and in turn thickening the disclosed peelable composition.

Barium sulfate is herein used for improving the properties of the disclosed peelable composition. Particularly, it improves the disclosed peelable composition in terms of electrical insulation, thermal expansion, light resistance and thermal stability. It also helps to reduce linear expansion coefficient and contraction coefficient, increase heat conductivity, enhance the stability of the adhesive layer, increase heat tolerance and mechanical strength, change the flow behavior of the colloidal peelable composition or adjust the viscosity of the peelable composition.

For the purpose of the present invention, barium sulfate preferably has an average particle size ranging between 1 and 50 nm, to be effective in improving the peelable protective film in terms of wearing- and acid-resisting ability.

For the purpose of the present invention, calcium carbonate preferably has an average particle size ranging between 30 and 100 nm, to be effective in increasing the tenacity of the disclosed peelable composition, and lowering the contraction coefficient of the resultant peelable protective film, thereby endowing the peelable protective film with a smooth and scratch-proof surface. Particularly, the disclosed peelable composition may use nano colloidal calcium carbonate as a filler, to have improved thermal stability and dispersibility, making it even more suitable for peelable protective film applied to optical devices.

Without using any solvents, the disclosed peelable composition has a TI (under viscosity at 0.5 rpm/viscosity at 2.5 rpm) ranging between 2.00 and 2.20, low thixotropy, and stable viscosity, making it perfect for filming coating. Additionally, during the coating process, the disclosed peelable composition displays sag resistance, without causing sag.

The peelable protective film made from the disclosed peelable composition through a coating process meets the following requirements:
1. The peelable protective film has a peel strength ranging between 35 and 100 g/cm, preferably ranging between 45 and 80 g/cm. It can be easily peeled off and its adhesive layer leaves no residual adhesive on the adhered object;
2. The peelable protective film is resistant to baking. After three cycles of 180° C.-baking for 10 minutes, the adhesive layer of the peelable protective film still has good tenacity;
3. The peelable protective film is excellent in adhesion. When adhered to an adhered object and treated by the following treatments, it stays still without coming off:

Being vibrated by 46 khz ultrasonic waves at 45° C. for 5 minutes, receiving 10 $kg/cm^2$ high-pressure washing, being immersed in 60° C.-water for 26 minutes, being immersed in alkaline solution (3.17% NaOH) at 40° C. for 2 minutes, and being immersed in acid solution (aqua regia) at 46° C. for 2 minutes.

The following Embodiments and Comparative Examples are recited to demonstrate that the disclosed peelable composition is a suitable material for peelable protective film. The peelable compositions and resultant peelable protective film products of these Embodiments and Comparative Example are measured and evaluated for physical properties and other properties using the methods given below.

1. Viscosity:
The peelable composition is measured for viscosity at 25° C. using Viscotester VT-04F (Japan; R10N Co., Ltd.).

2. Thixotropic Index (T.I.):
The peelable composition is measured for thixotropic index at 25° C. using DVII+Pro Viscometer (MA, USA; Brookfield Engineering).

Measuring Method: After the peelable composition is stabilized at 2.5 rpm for 3 minutes, the viscosity thereof is measured as $V_1$, and after the peelable composition is stabilized at 0.5 rpm for 3 minutes, the viscosity thereof is measured as $V_2$, where Thixotropic Index (T.I.)=$10V_2/V_1$.

3. Viscosity Stability:
The peelable composition is set aside at 25° C. for 24 hours in a clean room and then measured for viscosity using DVII+Pro Viscometer (MA, USA; Brookfield Engineering).

4. Sag Resistance:
The colloidal peelable composition is applied to an object to check whether it sags or not.

5. Dryness:
The peelable protective film has its first side pre-baked at 100-120° C. for 3 minutes and placed on a printing table to have its second side printed. The first side is then observed to determine whether it does not stick on the printing table.

6. Baking Resistance:
The peelable protective film is subject to three cycles of 180° C.-baking for 10 minutes. Then the peelable protective film is observed to determine whether its adhesive layer remains having tenacity.

7. Peelability:
The peelable protective film is bound with a piece of tape from 3M (MN, USA) and then the 3M tape is removed and observed to determine whether there is residual adhesive on it.

8. Adhesion:
The composition is applied to an adhered object and undergoes a film-forming process under 150° C. for 2 minutes to make the resultant peelable protective film attach on the adhered object. Afterward, the following 5 methods are used to test the peelable protective film for adhesion.

After the treatments, visual observation is performed to determine whether the peelable protective film comes off from the adhered object. Where no coming-off occurs, the peelable protective film is determined as having excellent adhesion.

a. Ultrasonic Vibration:

An adhered object with the peelable protective film attached thereon is vibrated by 46 kHz ultrasonic waves at 45° C. for 5 minutes.

b. High-Pressure Water Injection (or called Washing Resistance):

An adhered object with the peelable protective film attached thereon is subject to 10 kg/cm$^2$ water injection.

c. Hot-Water Immersion:

An adhered object with the peelable protective film attached thereon is immersed in water at 60° C. for 26 minutes.

d. Alkali Resistance:

An adhered object with the peelable protective film attached thereon is immersed in a 3.17% NaOH solvent at 40° C. for 2 minutes.

e. Acid Resistance:

An adhered object with the peelable protective film attached thereon is immersed in an aqua-regia-series solvent at 46° C. for 2 minutes.

9. Peel Strength:

A piece of 1-cm-wide peelable protective film is peeled off from an adhered object and its 180-degree peel strength is measured.

The peelable protective film leaves no residual adhesive during the process of peeling off, only if the peel strength of the peelable protective film ranges between 35 and 100 g/cm.

The following examples are provided to illustrate the present invention without limiting the scope of the present invention.

Embodiments 1-6

Peelable compositions of Embodiments 1-6 were prepared according to the compositional formulas of Table 1 (with the numbers given being parts by weight) and measured for their physical properties, including viscosity, thixotropic index, viscosity stability and sag resistance. The measurements are shown in Table 2.

The prepared peelable composition were then processed through a coating process to produce peelable protective film products, respectively, whose properties were also measured, including baking resistance, peelability, adhesion and peel strength. The measurements are shown in Table 3.

Comparative Examples 1-4

Peelable compositions of Comparative Examples 1-4 were prepared according to the compositional formulas of Table 1 (with the numbers given being parts by weight) and measured for their physical properties, including viscosity, thixotropic index, viscosity stability and sag resistance. The measurements are shown in Table 2.

The prepared peelable composition were then processed through a coating process to produce peelable protective film products, respectively, whose properties were also measured, including baking resistance, peelability, adhesion and peel strength. The measurements are shown in Table 3.

TABLE 1

Compositions of Embodiments and Comparative Examples

| Component | | Embodiment Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Vinyl Chloride-Vinyl Acetate Copolymer[1] | | 49.1 | 49.1 | 49.1 | 49.1 | 49.1 | 30.7 | — | — | 61.4 | — |
| Vinyl Chloride-Vinyl Acetate Copolymer[2] | | — | — | — | — | — | — | — | — | — | 49.1 |
| PVC Emulsification Powder PR1069[3] | | 6.15 | 4.1 | 4.1 | 6.15 | 8.2 | 15.3 | 61.4 | — | — | 12.3 |
| PVC Emulsification Powder PR415[4] | | 6.15 | 8.2 | 8.2 | 6.15 | 4.1 | 15.4 | — | 61.4 | — | — |
| Plasticizer | TOTM | 15 | 20 | 22.5 | 24 | 25 | 27 | 30 | — | — | — |
| | TXIB[5] | 15 | 10 | 7.5 | 6 | 5 | 3 | — | 30 | — | — |
| | DINP | — | — | — | — | — | — | — | — | 30 | 30 |
| Blue Pigment | | 0.1 | 0.1 | 0.1 | 0.1 | 0.1 | 0.1 | 0.1 | 0.1 | 0.1 | 0.1 |
| Ca—Zn Stabilizer | | 1 | 1 | 1 | 1 | 1 | 1 | 1 | 1 | 1 | 1 |
| Fumed Silica | | 1.5 | 1.5 | 1.5 | 2.5 | 2.5 | 2.5 | — | — | — | — |
| Aluminum Hydroxide | | 0.25 | 0.5 | 0.5 | 1.0 | 1.0 | 1.0 | — | — | — | — |
| BaSO$_4$ | | 0.25 | 0.5 | 0.5 | 1.0 | 1.0 | 1.0 | — | — | — | — |
| CaCO$_3$ | | 5.5 | 5.0 | 5.0 | 3.0 | 3.0 | 3.0 | 7.5 | 7.5 | 7.5 | 7.5 |
| Total | | 100 | 100 | 100 | 100 | 100 | 100 | 100 | 100 | 100 | 100 |

Note:
[1]The vinyl chloride-vinyl acetate copolymer contents 5.0% vinyl acetate, and has a K-value of 70.
[2]The vinyl chloride-vinyl acetate copolymer contents 13.0% vinyl acetate, and has a K-value of 50.
[3]PVC emulsification powder PR1069 is a kind of high-molecular-weight PVC emulsification powder produced by Formosa Plastics Corporation (Taiwan), and has a K-value of 77.5-81.
[4]PVC emulsification powder PR415 is a kind of low-molecular-weight PVC emulsification powder produced by Formosa Plastics Corporation (Taiwan), and has a 73.0-76.5.
[5]TXIB refers to 2,2,4-trimethyl-1,3-pentanediol diisobutyrate.

TABLE 2

Physical Properties of Peelable Compositions of Embodiments and Comparative Examples

| Physical Property | Embodiment Example | | | | | | Comparative Example | | | |
|---|---|---|---|---|---|---|---|---|---|---|
| | 1 | 2 | 3 | 4 | 5 | 6 | 1 | 2 | 3 | 4 |
| Viscosity[6] (ps) | 490 | 500 | 510 | 540 | 560 | 520 | 700 | 730 | 750 | 850 |
| Thixotropic Index[7] (TI) | 2.10 | 2.12 | 2.16 | 2.05 | 2.06 | 2.16 | 3.90 | 3.98 | 3.80 | 4.1 |
| Viscosity Stability[8] | Good | Good | Good | Very Good | Very Good | Good | Poor | Poor | Poor | Poor |
| Sag Resistance | no sag | no sag | no sag | no sag | no sag | no sag | With sag | With sag | With sag | With sag |

Note:
[6]The viscosity is measured at 25° C. by using a Viscotester VT-04F (Japan; RION Co., Ltd.);
[7]The thixotropic index (=10V$_2$/V$_1$) is measured at 25° C. by using a DVII + Pro Viscometer (MA, USA; Brookfield Engineering) wherein viscosity V$_2$ measured at 0.5 rpm for 3 minutes and viscosity V$_1$ measured at 2.5 rpm for 3 minutes;
[8]The peelable composition is set aside at 25° C. for 24 hours in a clean room and then measured for viscosity using DVII + Pro Viscometer (MA, USA; Brookfield Engineering). Viscosity stability was evaluated as very good (or excellent), good, fair or poor.

TABLE 3

Properties of Peelable Protective Film Products of Embodiments and Comparative Examples

| Physical Property | Embodiment Example | | | | | | Comparative Example | | | |
|---|---|---|---|---|---|---|---|---|---|---|
| | 1 | 2 | 3 | 4 | 5 | 6 | 1 | 2 | 3 | 4 |
| Dryness[9] (stuck on table or not) | No | No | No | No | No | No | No | Yes | Yes | Yes |
| Baking Resistance[10] (tenacity of adhesive) | Fair | Good | Very Good | Very Good | Very Good | Very Good | Poor | Poor | Poor | Poor |
| Peelability (residual adhesive leaved) | No | No | No | No | No | No | Yes | Yes | Yes | Yes |
| Ultrasonic Vibration (peeled off or not) | No | No | No | No | No | No | Yes | Yes | Yes | Yes |
| Washing Resistance[11] (peeled off or not) | No | No | No | No | No | No | Yes | Yes | Yes | Yes |
| Ca—Zn Stabilizer (peeled off or not) | No | No | No | No | No | No | Yes | Yes | Yes | Yes |
| Alkali Resistance[12] | Good | Good | Good | Very Good | Very Good | Very Good | Poor | Poor | Poor | Poor |
| Acid Resistance[13] | Good | Good | Good | Very Good | Very Good | Very Good | Poor | Poor | Poor | Poor |
| Peel Strength (g/cm) | 55 | 70 | 65 | 85 | 80 | 50 | 30.5 | 20 | 110 | 125 |

Note:
[9]The peelable protective film has its first side pre-baked at 100-120° C. for 3 minutes and placed on a printing table to have its second side printed. The first side is then observed to determine whether it stuck on the printing table or not.
[10]The peelable protective film is subject to three cycles of 180° C.-baking for 10 minutes. The tenacity of the adhesive layer of each peelable protective film was rated as being very good (or excellent), good, fair or poor.
[11]The peelable protective film attached on the adhered object is subject to 10 kg/cm$^2$ of high pressure water injection.
[12]The peelable protective film was immersed in a 3.17% NaOH solvent at 40° C. for 2 minutes, and then the adhesion thereof was rated as being very good (or excellent), good, fair or poor.
[13]The peelable protective film was immersed in an aqua-regia-series solvent at 46° C. for 2 minutes, and then the adhesion thereof was rated as being very good (or excellent), good, fair or poor.

Result:

1. Each of the peelable compositions of Comparative Examples 1-4 uses only one or two of the vinyl chloride-vinyl acetate copolymer and the high- and low-molecular-weight emulsified, polymerized PVC powder together with one plasticizer, without using the thickening agents, namely fumed silica and aluminum hydroxide.

On the other hand, each of the peelable compositions of Embodiments 1-6 uses all the vinyl chloride-vinyl acetate copolymer and the high- and low-molecular-weight emulsified, polymerized PVC powder with the trimellitate plasticizer and the diisobutyrate plasticizer, and incorporates other specific components, such as the thickening agents, namely fumed silica and aluminum hydroxide.

By comparing the peelable compositions in terms of viscosity, thixotropic index, viscosity stability and sag resistance, as shown in Table 2, it can be seen that the peelable compositions of Embodiments 1-6 have their physical properties much better than those of the peelable compositions of Comparative Examples 1-4.

Particularly, the peelable compositions of Embodiments 1-6 have their thixotropy index (T.I.) ranging between 2.05 and 2.16, so their thixotropy is low and viscosity is stable. These properties are favorable to film coating, and endow the resultant peelable protective film with good endurance under long-term storage.

2. According to Table 3, the peelable protective film products of Embodiments 1-6 have their peel strength ranging between 50 and 80 g/cm, within the range of peel strength of 35-100 g/cm that allows the peelable protective film to be peeled off without residual adhesive leaved.

The peelable protective film products of Comparative Examples 1-4, as shown in Table 3, all have their peel strength outside the range of 35-100 g/cm. The film of Comparative Example 3 using the full amount of the vinyl chloride-vinyl acetate copolymer and the film of Comparative Example 4 having a high content of vinyl acetate both have their peel strength too high to be easily peeled off.

By comparison, the film products of Embodiments 1-6 are excellent as they can be easily peeled off and leave no residual adhesive on the adhered objects.

3. As described in the previous section, in terms of baking resistance, peelability, adhesion, and particularly in terms of vibration resistance, washing resistance, water resistance, acid resistance and alkali resistance, according to Table 3, the peelable protective film products of Embodiments 1-6 have their physical properties better than those of the peelable protective film products of Comparative Examples 1-4.

To sum up, the peelable protective film products of Embodiments 1-6 are excellent in adhesion, when adhered to an adhered object to provide temporary protection, the problem of peeling off from the adhered object does not occur.

4. The peelable protective film products of Embodiments 4-6 are better than those of Comparative Examples 1-4, and even better than those of Embodiments 1-3, when it comes to acid resistance, alkali resistance and adhesion.

From the measurements of the peelable protective film products of Comparative Examples 1-4, it is demonstrated that both aluminum hydroxide and barium sulfate contained in the peelable compositions of Embodiments 1-6 have positive influence to peelable protective film made from the same.

What is claimed is:

1. A composition for making a peelable protective film, prepared by mixing a vinyl chloride-vinyl acetate copolymer having a content of vinyl acetate with high-molecular-weight emulsified, polymerized PVC powder and low-molecular-weight emulsified, polymerized PVC powder and plasticizers without using any solvents, wherein the composition has a thixotropic index (T.I.) ranging between 2.00 and 2.20 as measured by a rotational viscometer under a setting of viscosity at 0.5 rpm/viscosity at 2.5 rpm, and comprises the following components by weight of the composition:
    a) a vinyl chloride-vinyl acetate copolymer, having a K-value of between 69 and 71, and being present in an amount ranging between 10 wt % and 65 wt %, wherein the content of vinyl acetate ranges between 1.0% and 12.5%;
    b) a high-molecular-weight emulsified, polymerized PVC powder, having an average degree of polymerization ranging between 1650 and 1850 and a K-value of between 77.5 and 81, and being present in an amount ranging between 3 wt % and 20 wt %;
    c) a low-molecular-weight emulsified, polymerized PVC powder, having an average degree of polymerization ranging between 1350 and 1550 and a K-value of between 73.0 and 76.5, and being in an amount ranging between 3 wt % and 20 wt %;
    d) a trimellitate plasticizer, being present in an amount ranging between 5 wt % and 40 wt %;
    e) a TXIB (2,2,4-trimethyl-1,3-pentanediol diisobutyrate) plasticizer, being present in an amount ranging between 1 wt % and 20 wt %, wherein, a ratio of the trimellitate plasticizer to the TXIB plasticizer ranges between 1.0 and 9.0;
    f) a phenol-free Ca—Zn stabilizer, being present in an amount ranging between 0.5 wt % and 3 wt %;
    g) a fumed silica, being present in an amount ranging between 1 wt % and 10 wt %;
    h) an aluminum hydroxide, being present in an amount ranging between 0.1 wt % and 20 wt %;
    i) a barium sulfate, being present in an amount ranging between 0.1 wt % and 20 wt %, wherein the barium sulfate has an average particle size ranging between 1 nm and 50 nm; and
    j) a calcium carbonate, being present in an amount ranging between 0.1 wt % and 20 wt %, wherein the calcium carbonate has an average particle size ranging between 30 nm and 100 nm.

2. The composition of claim 1, wherein the content of vinyl acetate in the vinyl chloride-vinyl acetate copolymer ranges between 4.0% and 6.9%.

3. The composition of claim 1, wherein the trimellitate plasticizer is selected from the group consisting of trimethyl trimellitate (TMTM), triethyl trimellitate (TETM), trihexyl trimellitate (THTM), trisooctyl trimellitate (TIOTM), tri(2-ethylhexyl)trimellitate (TOTM) and any combination thereof.

4. The composition of claim 1, wherein the ratio of the trimellitate plasticizer to the TXIB plasticizer ranges between 4.0 and 6.0.

5. The composition of claim 1, wherein the fumed silica contained in the composition has a particle size ranging between 5 nm and 50 nm and a surface area ranging between 50 and 600 m$^2$/g.

6. A peelable protective film made of the composition of claim 1, being characterized in having a peel strength ranging between 35 g/cm and 100 g/cm.

7. The peelable protective film of claim 6, wherein the peelable protective film has a peel strength ranging between 45 g/cm and 80 g/cm.

8. The peelable protective film of claim 6, remaining attachment without peeling off after one or more of the following treatments:
    a) ultrasonic vibration of 46 khz at 45° C. for 5 minutes;
    b) high-pressure washing of 10 kg/cm$^2$;
    c) immersion in heated water of 60° C. for 26 minutes;
    d) immersion in NaOH-based alkaline solution of 3.17% at 40° C. for 2 minutes; and
    e) immersion in acid solution of aqua regia at 46° C. for 2 minutes.

9. The peelable protective film of claim 7, remaining attachment without peeling off after one or more of the following treatments:
    a) ultrasonic vibration of 46 khz at 45° C. for 5 minutes;
    b) high-pressure washing of 10 kg/cm$^2$;
    c) immersion in heated water of 60° C. for 26 minutes;
    d) immersion in NaOH-based alkaline solution of 3.17% at 40° C. for 2 minutes; and
    e) immersion in acid solution of aqua regia at 46° C. for 2 minutes.

* * * * *